March 17, 1942.   J. V. CAPUTO   2,276,924
METHOD OF WELDING
Original Filed Dec. 31, 1934
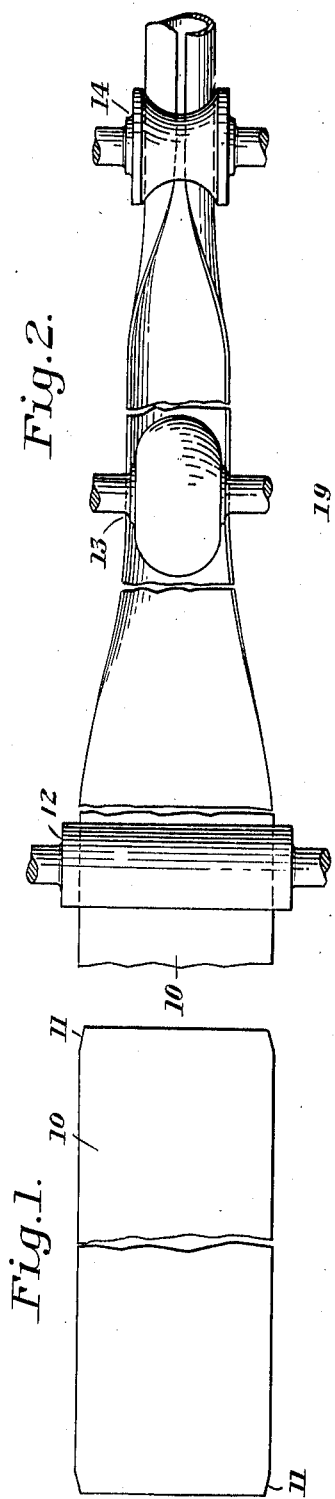
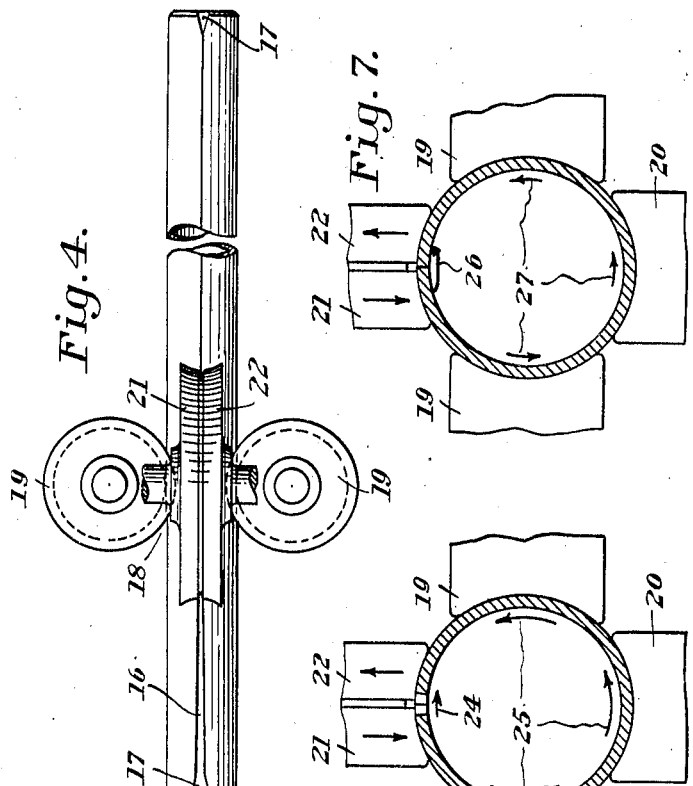
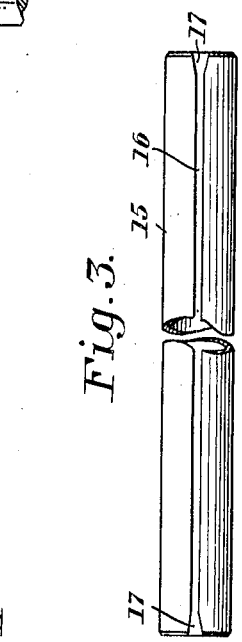
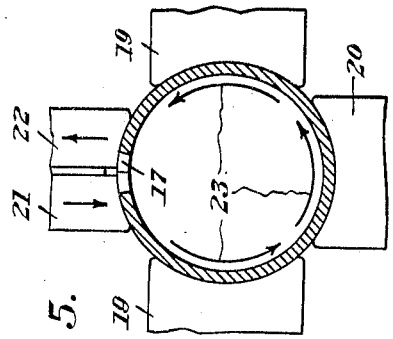
INVENTOR
James V. Caputo
by his attorneys
Stebbins, Blenko & Parmelee Patented Mar. 17, 1942

2,276,924

UNITED STATES PATENT OFFICE 2,276,924

METHOD OF WELDING

James V. Caputo, Crafton, Pa.

Original application December 31, 1934, Serial No. 759,809, now Patent No. 2,202,898, dated June 4, 1940. Divided and this application April 23, 1940, Serial No. 331,138

9 Claims. (Cl. 219—10)

This invention relates to welding and, in particular, to the progressive welding together of abutting metal plate edges by the resistance method, utilizing rotary-contact electrodes for supplying the welding current to the plate edges.

This is a division from my copending application Ser. No. 759,809, filed December 31, 1934, for Pipe welding, which has matured into Patent No. 2,202,898, dated June 4, 1940.

In the progressive welding of metal plate edges by the resistance method, utilizing a rotary-contact electrode, difficulty has been experienced because of the burning and pitting of the electrodes resulting from arcing which occurs even though the current is not supplied to the electrode until after engagement thereof by the edges to be welded. A definite time is required after the current starts to flow for the edges to be brought to welding temperature and more or less stable conditions achieved. Prior to that time, the welding current is subject to large and sudden variations, giving rise to the arcing above-mentioned and thereby pitting or burning the electrodes.

A further difficulty which is particularly noticeable in the welding of tubular blanks having a longitudinal seam cleft, to form pipe, is the fact that the welding throat through which the blank is passed to weld its edges, the throat usually being composed of a plurality of pressure and supporting rolls with the electrodes, is subjected to extremely heavy forces as the leading end of the blank enters. This is because the throat is set to effect a certain amount of upsetting of the edges with a consequent reduction in the diameter of the blank. As above stated, however, the welding does not commence until a predetermined time after the entrance of the blank in the throat. This means that there can be no upsetting of the blank at its leading end and no substantial reduction in the diameter thereof. The welding throat thus has to be sprung, to admit the leading end of the blank which cannot be reduced, whereas the throat is actually set for the somewhat smaller diameter of the welded pipe, the difference being represented by the metal upset and extruded at the weld.

I have invented a novel method of welding which overcomes the aforementioned objections to the prior practice in this art and accomplishes other useful and beneficial results. In a preferred practice of the invention, I remove the corners from the leading ends of the plate edges to be welded as by shearing them off up to a short distance from the ends. This procedure achieves two results of prime importance. In the first place, it causes the welding current to traverse a path much longer than the normal path across the seam, when it is first established, thus holding the current to a relatively low value and causing it to increase progressively, thus avoiding the arcing which causes pitting and burning of the electrode. In the second place, the procedure specified permits contraction of the blank at its extreme leading end without subjecting the welding throat to abnormal forces. A further understanding of the method and the manner in which the aforementioned results are produced may be had from the following detailed description and explanation which refer to the accompanying drawing illustrating the preferred practice diagrammatically. In the drawing, Fig. 1 is a plan view of a length of skelp which has had its corners removed;

Fig. 2 illustrates the progressive forming of the skelp into a tubular blank;

Fig. 3 illustrates the blank in its final form;

Fig. 4 illustrates diagrammatically the progressive welding of the edges of the blank to form it into pipe; and Figs. 5, 6 and 7 are transverse sectional views through the pipe with the rolls and electrodes composing the welding throat being shown in elevation, at short but progressively increasing distances from the leading end, illustrating the manner in which the current flow changes between successive instants during the entrance of the leading end of the pipe into the welding throat.

Referring now in detail to the drawing, a length of skelp 10 has its corners removed as shown at 11. This may be accomplished by shearing, grinding, milling, or any other convenient method or process. Alternatively, furthermore, the removal of the corners of the skelp may be deferred until it has actually been formed into a tubular blank. The skelp is preferably sheared to the desired width and length although for many reasons, the procedure described and claimed in my copending application above-referred to, i. e., shearing the longitudinal edges after forming the blank, is to be preferred.

In any event, the skelp is preferably formed into a tubular blank progressively as shown in Fig. 2 by the successive action thereon of a plurality of forming roll stands, a few of which are illustrated at 12, 13 and 14. Mills for forming flat skelp successively into tubular blanks are well-known and require no detailed description. It is sufficient to state that such mills have been produced and operated successively in the manufacture of electrically welded pipe on a large scale. It will be understood, of course, that the skelp may be formed into a blank by means other than that indicated in Fig. 2. The precise method or mechanism used for this purpose does not concern my invention.

The appearance of the blanks resulting from the forming of the flat skelp, regardless of the method or apparatus utilized therefor, is shown in Fig. 3. A tubular blank 15 has a longitudinal seam cleft 16 extending therealong, the edges of which may be progressively welded together to convert the blank into a length of pipe. If the corners of the skelp have not previously been removed as shown at 11, that operation is performed at this stage, i. e., after forming of the blank and prior to the welding thereof. In either case, the effect is to provide a widening of the seam cleft at each end of the blank as indicated at 17. At this stage, furthermore, the leading end of the blank or both ends may be beveled, if desired, by any suitable operation, to facilitate entry of the blank into the welding throat.

The blank is now ready to be welded by passing it through a welding throat 18 as shown in Fig. 4. The welding throat may conveniently be defined by side pressure rolls 19, a bottom support roll 20 (see Fig. 5) and electrodes 21 and 22. The latter are grooved disks of conducting material preferably joined together mechanically but insulated from each other, and connected to a suitable source of welding current. As shown in Fig. 4, the pressure rolls 19 progressively close the cleft 16, bringing the edges thereof into abutment at about the plane defined by the axes of the pressure rolls at which point they are raised to welding temperature by the passage of current across the minute gap between the edges, whereby the latter are permanently united. At the stage of operations illustrated in Fig. 4, by far the greater portion of the welding current flows across the seam cleft and only a very small portion flows around the circumference of the pipe because the resistance of the latter path is materially greater than that of the short path across the seam.

Considering now the conditions existing when the leading end of the blank first enters the welding throat, it is to be remembered that the flow of welding current between the electrodes is not started until the latter have been initially engaged by the leading ends of the edges of the seam cleft. For obvious reasons, the current is started at the earliest possible moment. The conditions existing when the leading end of the blank has just passed the plane defined by the axes of the side pressure rolls, and the welding current has just been started, may be represented as shown in Fig. 5. At that instant, the electrodes 21 and 22 engage the blank at a point where the width of the seam cleft is a maximum, i. e., at 17. By removing the corners of the skelp to the proper degree of angularity to provide the necessary maximum width of seam cleft, practically all of the welding current initially supplied flows around the body of the pipe as indicated by the arrows 23 and practically non across the seam cleft because of the great width thereof. The resistance of the so-called back path, i. e., around the body of the pipe is, as previously stated, many times that of the cross-seam path. If the voltage of the welding-current source is so chosen as to effect the desired flow of current across the seam cleft, therefore, the amount of current which will flow around the body of the pipe under the conditions illustrated in Fig. 5 will obviously be much smaller than the normal welding current.

Fig. 6 illustrates conditions as they exist an instant after the stage of the welding operation indicated in Fig. 5. The advancement of the blank has brought a narrower portion of the widened seam cleft 17 under the electrode and at a certain point, a small amount of current will flow across the seam cleft as indicated by the arrow 24, through an indirect path from one electrode, along the cleft edge engaged thereby to a point where the cleft edges are in contact with each other, thence back along the other cleft edge to the other electrode. As the length of the path decreases, the current increases. The flow of current along the cleft edges effects a preliminary heating thereof, preparatory to welding. At the same time, a substantial current continues to flow around the back path as indicated by the arrows 25.

Figure 7 illustrates the conditions existing after the cut-out corners at the ends of the cleft have passed the electrodes and the cleft has been closed by the rolls 19, as shown in Figure 4. Current now flows directly across the seam as indicated by the arrow 26 and only a small portion flows around the back path as indicated by the arrows 27. This is because of the relative magnitudes of the resistance of the two paths.

From the foregoing explanation, it will be apparent that by my invention, the welding current is restricted to a low value at the instant it is initiated, by the relatively high resistance of the back path, and that the magnitude of the current is progressively increased as the width of the seam cleft decreases, thereby progressively diverting the greater part of the current from the back path into the cross-seam path. It will be readily apparent that this gradual building up of the welding current is extremely beneficial in avoiding the arcing which has heretofore been found to characterize the initiation of the welding current, causing burning and pitting of the electrodes.

Similar results are obtained at the trailing end of the blank, except in a reverse order. As the trailing end of the blank approaches the electrode, the widening of the seam cleft at the extreme end reduces the magnitude of the cross-seam current and causes more and more of the current to be shifted to the back path. The resistance of this path being much greater than that of the cross-seam path, the current is gradually reduced to a minimum before it is actually cut off just prior to the passage of the trailing end of the blank into the welding throat. It will be apparent that this greatly facilitates the problem of terminating the welding current in a very short interval of time, which is essential if excessive end scrap loss is to be avoided. The gradual reduction of the welding current, furthermore, also aids in preventing arcing with the consequent elimination of pitting and burning, as in the case of the leading end of the blank.

A further important advantage of the invention is that it relieves the welding throat of abnormal stress upon the entrance of the leading end of the blank thereinto. The welding throat is set to effect the upsetting of the seam cleft edges necessary to obtain a good weld with the result that the finished pipe is slightly smaller in diameter than the blank with its seam cleft closed. Since some time is required after the entrance of each successive blank, for the edges thereof to be heated to welding temperature, there can be no upsetting of the edges nor reduction in the diameter of the blank at the extreme leading end thereof. This means that prior to my invention, the welding throat has had to be sprung sufficiently to permit the passage of the leading end of the blank even though no upsetting of the edges nor reduction in the diameter could take place thereat. By removing the corners of the blank at the leading end, that portion of the blank can be reduced in diameter on passing through the welding throat, to the same extent as the following portions of the blank after heating of the cleft edges, without imposing any abnormal stress on the welding throat. It will be understood, of course, that the contraction of the blank at the leading end is only temporary as the weld does not commence until the first few inches of the length of the blank have passed through the throat.

While the invention has been described with particular reference to the welding of the edges of pipe blanks, it will be recognized that the advantages thereof also apply to the progressive welding of the edges of flat plates. By removing the corners at the leading ends of the abutting edges of such plates, the welding current, instead of flowing across the seam cleft when first initiated, flows along the cleft to a point at which the edges are in abutment. This long path through the metal, like the back path of the pipe, has a resistance much greater than that of the direct cross-seam path, which produces a similar effect insofar as causing a gradual building up of the welding current at the leading edges, and a gradual decrease thereof at the trailing end. A further advantage of the invention is that the removal of the corners of the skelp reduces the possibility of injury to the electrode thereby.

Although I have illustrated and described but a preferred practice of the invention, it will be understood that changes in the procedure disclosed may be made without departing from the spirit of the invention or the scope of the appended claims.

I claim:

1. In a method of making pipe, the steps including forming skelp into blanks, each having a longitudinal seam cleft, and progressively welding said edges together by causing engagement thereof with electrodes, thereby passing current between said edges to heat them to fusion and pressing them together, and causing said current to build up gradually by widening the seam cleft at the leading end whereby current initially flows around the blank and is gradually diverted to a path across said cleft.

2. In a method of welding substantially abutting, metal, plate edges by bringing them progressively into contact with electrodes, the steps including limiting the initial flow of current through the electrodes by widening the gap between said edges where the latter first engage the electrodes, thereby causing the current to follow a path through the metal which is longer and of higher resistance than the path across the joint between the edges at points where they are in abutment.

3. In a method of welding substantially abutting, metal, plate edges by bringing them progressively into contact with electrodes, the steps including limiting the initial flow of current through the electrodes by progressively widening the gap between the edges toward the ends thereof which are first engaged by the electrodes, thereby causing the current to follow a path through the metal which is longer and of higher resistance than the path across the joint between the edges at points where they are in abutment, the resistance of said longer path decreasing and the current building up gradually as the first point along the edges at which they are in abutment, approaches the electrodes.

4. In a method of welding substantially abutting, metal, plate edges by bringing them progressively into contact with electrodes, the steps including limiting the initial flow of current through the electrodes by clipping the leading corners of said edges thereby widening the gap therebetween at points where the edges first engage the electrodes and causing the current to follow a path through the metal which is longer and of higher resistance than the path across the joint between the edges at points where they are in abutment.

5. In a method of welding substantially abutting, metal, plate edges by bringing them progressively into contact with electrodes, the steps including gradually decreasing the flow of welding current as the trailing ends of the edges approach the electrodes, by widening the gap between the edges progressively thereby progressively diverting the current from the minimum-length path across the gap to a longer path through the metal having a higher resistance.

6. In a method of welding substantially abutting, metal, plate edges by bringing them progressively into contact with electrodes, the steps including gradually decreasing the flow of welding current as the trailing ends of the edges approach the electrodes, by clipping the corners of said edges at the trailing ends thereof thereby widening the gap between the edges progressively and gradually diverting the current from the minimum-length path across the gap to a longer path through the metal having a higher resistance.

7. In a method of making pipe, the steps including forming skelp into a cylindrical blank with a longitudinally extending seam cleft, removing metal from the skelp edges at one end of the blank to widen the cleft adjacent said end, progressively abutting the skelp edges together, engaging the skelp edges at said end with contact electrodes, and maintaining a voltage between the latter sufficient to cause welding current to flow along said edges to the point of initial contact therebetween.

8. In a method of welding metal plate edges disposed close together with a seam cleft therebetween, the steps including removing metal from the edges at one end to widen the cleft, progressively abutting the edges together, engaging the edges at said end with contact electrodes, and maintaining a voltage between the latter sufficient to cause welding current to flow along said edges to the point of initial contact therebetween.

9. In a method of making pipe, the steps including forming skelp into blanks, each having a longitudinal seam cleft, and progressively welding said edges together by causing engagement thereof with electrodes, thereby passing current between said edges to heat them to fusion and pressing them together, and causing said current to vary gradually during the engagement of said electrodes with said edges adjacent one end of the blank by widening the seam cleft at said end whereby the current traversing said edges is gradually shifted between a path across said cleft and a path around the blank.

JAMES V. CAPUTO.